US009724951B2

(12) United States Patent
Ishimi et al.

(10) Patent No.: US 9,724,951 B2
(45) Date of Patent: Aug. 8, 2017

(54) IMAGE ERASING METHOD, IMAGE ERASING APPARATUS, AND CONVEYOR LINE SYSTEM USING IMAGE ERASING APPARATUS

(71) Applicant: RICOH COMPANY, LTD, Tokyo (JP)

(72) Inventors: Tomomi Ishimi, Shizuoka (JP); Shinya Kawahara, Shizuoka (JP); Toshiaki Asai, Shizuoka (JP); Katsuya Ohi, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/075,114

(22) Filed: Mar. 19, 2016

(65) Prior Publication Data

US 2016/0271991 A1    Sep. 22, 2016

(30) Foreign Application Priority Data

Mar. 20, 2015    (JP) .................................. 2015-057028

(51) Int. Cl.
*B41M 7/00* (2006.01)
*B41J 2/47* (2006.01)
(Continued)

(52) U.S. Cl.
CPC .............. *B41M 7/0009* (2013.01); *B41J 2/32* (2013.01); *B41J 2/47* (2013.01); *B41J 2/4753* (2013.01);
(Continued)

(58) Field of Classification Search
CPC ....... B41J 2/315; B41J 2/32; B41J 2/47; B41J 2/473; B41J 2/4753; B41J 2202/37;
(Continued)

(56) References Cited

U.S. PATENT DOCUMENTS 6,633,319 B1 * 10/2003 Yamakawa .............. B41J 2/473
347/172
7,439,993 B2 * 10/2008 Ishimi ..................... B41J 2/471
347/179
(Continued)

FOREIGN PATENT DOCUMENTS

JP     11-151856     6/1999
JP     2000-136022   5/2000
(Continued)

OTHER PUBLICATIONS

European search report dated Jul. 25, 2016 in corresponding European Patent Application No. 16159947.7.

*Primary Examiner* — Anh T. N. Vo
(74) *Attorney, Agent, or Firm* — Cooper & Dunham LLP

(57) ABSTRACT

Provided is an image erasing method including heating a thermoreversible recording medium with laser beams to erase an image which has been recorded on the thermoreversible recording medium, the thermoreversible recording medium reversibly changing between a colored state and a decolored state depending on a heating temperature and a cooling time; and measuring at least one of a surface temperature of the thermoreversible recording medium and an erasing environmental temperature before a beginning of erasing the image to obtain a measured temperature value and controlling a heating time with the laser beams to be emitted for erasing the image depending on the measured temperature value.

15 Claims, 4 Drawing Sheets

(51) Int. Cl.
  *B41J 2/475* (2006.01)
  *G02B 26/10* (2006.01)
  *G06K 15/12* (2006.01)
  *B41M 5/30* (2006.01)
  *B41J 2/32* (2006.01)

(52) U.S. Cl.
  CPC ............. *B41M 5/305* (2013.01); *G02B 26/10* (2013.01); *G06K 15/1242* (2013.01); *G06K 15/1247* (2013.01); *B41J 2202/37* (2013.01)

(58) Field of Classification Search
  CPC ............ B41J 2202/4756; B41M 5/305; B41M 7/0009; G02B 26/10; G06K 15/1242; G06K 15/1247
  See application file for complete search history.

(56) References Cited

U.S. PATENT DOCUMENTS

| | | | |
|---|---|---|---|
| 7,728,860 B2 * | 6/2010 | Kawahara | ................ B41J 2/315 347/224 |
| 8,284,222 B2 * | 10/2012 | Ishimi | ...................... B41J 2/473 347/179 |
| 8,358,325 B2 | 1/2013 | Asai et al. | |
| 8,471,885 B2 | 6/2013 | Ishimi et al. | |
| 8,598,074 B2 | 12/2013 | Kawahara et al. | |
| 8,633,958 B2 | 1/2014 | Kawahara et al. | |
| 8,643,689 B2 | 2/2014 | Ishimi et al. | |
| 8,665,496 B2 | 3/2014 | Hasegawa et al. | |
| 8,933,981 B2 | 1/2015 | Yamamoto et al. | |
| 9,090,105 B2 | 7/2015 | Ishikake et al. | |
| 2007/0225162 A1 | 9/2007 | Kawahara et al. | |
| 2008/0064596 A1 | 3/2008 | Iino et al. | |
| 2008/0192618 A1 | 8/2008 | Nakata et al. | |
| 2012/0075402 A1 | 3/2012 | Ishimi et al. | |
| 2012/0211673 A1 | 8/2012 | Yamamoto | |
| 2013/0135425 A1 | 5/2013 | Yamamoto | |
| 2013/0141512 A1 | 6/2013 | Asai et al. | |
| 2014/0078234 A1 | 3/2014 | Kawahara et al. | |
| 2014/0099574 A1 | 4/2014 | Kawahara et al. | |
| 2014/0158771 A1 | 6/2014 | Ohi et al. | |
| 2014/0285606 A1 | 9/2014 | Ishimi et al. | |
| 2015/0080214 A1 | 3/2015 | Yamamoto et al. | |
| 2015/0151550 A1 | 6/2015 | Asai et al. | |

FOREIGN PATENT DOCUMENTS

| | | |
|---|---|---|
| JP | 2006-035683 | 2/2006 |
| JP | 2007-076122 | 3/2007 |
| JP | 2008-068630 | 3/2008 |
| JP | 2008-194905 | 8/2008 |
| JP | 2008-213439 | 9/2008 |
| JP | 4958506 | 3/2012 |
| JP | 5010878 | 6/2012 |
| JP | 5062838 | 8/2012 |
| JP | 5095962 | 9/2012 |
| WO | WO2013/084903 A1 | 6/2013 |

* cited by examiner

IMAGE ERASING METHOD, IMAGE ERASING APPARATUS, AND CONVEYOR LINE SYSTEM USING IMAGE ERASING APPARATUS

CROSS-REFERENCE TO RELATED APPLICATIONS

The present application claims priority under 35 U.S.C. §119 to Japanese Patent Application No. 2015-057028, filed Mar. 20, 2015. The contents of which are incorporated herein by reference in their entirety.

BACKGROUND OF THE INVENTION

Field of the Invention

The present invention relates to image erasing methods, image erasing apparatuses, and conveyor line systems using the image erasing apparatuses.

Description of the Related Art

Recently, an image processing apparatus using a thermoreversible recording medium has been incorporated into and utilized in a conveyor line system which needs to manage a conveying container (e.g., returnable container employed in a physical distribution system). The thermoreversible recording medium is attached on the conveying container as a label and is rewritable with laser beams emitted from the image processing apparatus in a non-contact manner. This eliminates a need for attaching and peeling off a label, which makes it possible to efficiently operate the conveyor line system.

The thermoreversible recording medium contains, for example, a leuco dye and a reversible color developer. When the thermoreversible recording medium is heated to equal to or higher than a coloring temperature range in which the leuco dye and the reversible color developer melt and then rapidly cooled, the thermoreversible recording medium turns into a colored state (visible state). Meanwhile, when the thermoreversible recording medium is heated to a decoloring temperature range, which is lower than the coloring temperature range, held for a predetermined period of time, and then cooled, the thermoreversible recording medium turns into a decolored state (invisible state). However, even though the thermoreversible recording medium is heated to equal to or higher than the coloring temperature range in order to develop a color, if thermoreversible recording medium is then slowly cooled, the thermoreversible recording medium turns into the decolored state.

The thermoreversible recording medium having such property as described above is problematic in that, under a high temperature environment, the thermoreversible recording medium is decreased in coloring density since the thermoreversible recording medium which has been heated is difficult to be rapidly cooled. On the other hand, under a low temperature environment, there also is a problem that the thermoreversible recording medium is decreased in the coloring density since the thermoreversible recording medium is difficult to be held within the decoloring temperature range after the thermoreversible recording medium is heated.

In order to solve the above problems, there has been proposed a method for controlling laser beam power depending on a surface temperature of the thermoreversible recording medium (see, Japanese Unexamined Patent Application Publication No. 2008-194905).

SUMMARY OF THE INVENTION

The present invention aims to provide an image erasing method which can prevent an image from remaining unerased without deteriorating throughput per day even when at least one of a surface temperature of a thermoreversible recording medium and an erasing environmental temperature is suddenly decreased to an unexpected level.

An image erasing method according to the present invention as a means for solving the above problems includes an image erasing step and a controlling step. The image erasing step is a step of heating a thermoreversible recording medium with laser beams to erase an image which has been recorded on the thermoreversible recording medium. The thermoreversible recording medium reversibly changes between a colored state and a decolored state depending on a heating temperature and a cooling time. The controlling step is a step of measuring at least one of a surface temperature of the thermoreversible recording medium and an erasing environmental temperature before a beginning of erasing the image to obtain a measured temperature value and controlling a heating time with the laser beams to be emitted for erasing the image depending on the measured temperature value.

According to the present invention, there can be provided an image erasing method which can prevent an image from remaining unerased without deteriorating throughput per day even when at least one of a surface temperature of a thermoreversible recording medium and an erasing environmental temperature is suddenly decreased to an unexpected level.

Figure 1:
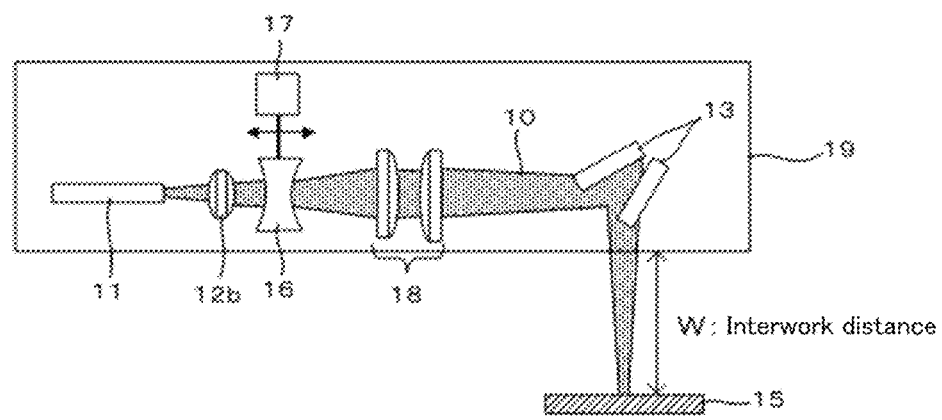
FIG. 1 is a schematic diagram illustrating one exemplary image processing apparatus.

DETAILED DESCRIPTION OF THE INVENTION (Image Processing Method and Image Processing Apparatus)

An image processing method is a method for rewriting an image on the thermoreversible recording medium by irradiating a thermoreversible recording medium with laser beams to heat the thermoreversible recording medium, to thereby erase and record the image, the thermoreversible recording medium reversibly changing between a colored state and a decolored state depending on a heating temperature and a cooling time.

The image processing method includes an image erasing step, an image recording step, and a control step which is a step of controlling a heating time in the image erasing step; and, if necessary, further includes appropriately selected other steps.

An image erasing method according to the present invention is not particularly limited and may be appropriately selected depending on the intended purpose, so long as the method includes at least the image erasing step and the control step among the above described steps.

The image erasing method now will be described in conformity with description for the image processing method.

The image processing method can be suitably performed by the image processing apparatus.

An image erasing method according to the present invention includes heating a thermoreversible recording medium with laser beams to erase an image which has been recorded on the thermoreversible recording medium, the thermoreversible recording medium reversibly changing between a colored state and a decolored state depending on a heating temperature and a cooling time; and measuring at least one of a surface temperature of the thermoreversible recording medium and an erasing environmental temperature before a beginning of erasing the image to obtain a measured temperature value and controlling a heating time with the laser beams to be emitted for erasing the image depending on the measured temperature value.

An image erasing apparatus according to the present invention includes a laser beam emitting unit configured to irradiate a thermoreversible recording medium with the laser beams to heat the thermoreversible recording medium, to thereby erase an image which has been recorded on the thermoreversible recording medium, the thermoreversible recording medium reversibly changing between a colored state and a decolored state depending on a heating temperature and a cooling time; a laser beam scanning unit configured to scan the laser beams to erase the image which has been recorded on the thermoreversible recording medium; and a control unit configured to measure at least one of a surface temperature of the thermoreversible recording medium and an erasing environmental temperature before a beginning of erasing the image to obtain a measured temperature value and control a heating time with the laser beams to be emitted for erasing the image depending on the measured temperature value.

The image erasing method according to the present invention is based on the following finding that there is a limit as described below in the method described in Japanese Unexamined Patent Application Publication No. 2008-194905 in order to prevent coloring density from decreasing only by controlling the laser beam power.

The conveyor line system is often located in, for example, a platform in a truck terminal exposed to the air, where an ambient temperature tends to be suddenly decreased to an unexpected level during the morning in winter. Specifically, when an erasing environmental temperature inside a laser beam shielding cover was measured in winter (from December to February), the temperature was lower than 0° C. (i.e., outside an operating temperature range) in a range of from 1% through 8% of the period of time from 7:00 AM through 10:00 AM. Thus, the erasing environmental temperature is lowered beyond the operating temperature range for a short time since, when the conveyer line system just starts operating, heat generated from a motor which is configured to operate, for example, a conveyer does not spread all over the laser beam shielding cover, making the erasing environmental temperature be equivalent to an ambient temperature.

In the case where the conveyer line system operates at a temperature lower than the operating temperature range, heat is rapidly dissipated even though laser beam power is increased. Therefore, the thermoreversible recording medium is difficult to be held within the decoloring temperature range for a predetermined period of time. As a result, an image tend to remain unerased, leading to reading failure of a barcode and thus stopping of the conveyer line system. Additionally, there is a need for the conveyer line system to achieve high throughput per day. That is, there is a need to operate the conveyer line system while keeping image quality even under the unfavorable condition as described above.

The image processing apparatus includes an image processing section into which an image erasing section configured to perform the image erasing step (an image erasing apparatus according to the present invention) and an image recording section configured to perform the image recording step are integrated; and, if necessary, further includes appropriately selected other sections.

Note that, the image erasing section and the image recording section of the image processing apparatus may be separated as the image erasing apparatus and the image recording apparatus. However, the image processing section is preferable since an image can be erased and recorded at one laser beam emitting position and the time for which the conveying container is conveyed from the image erasing section to the image recording section can be shortened, in response to the demand for a shortened rewriting processing time.

<Image Processing Section>

The image processing section includes a laser beam emitting unit, a laser beam scanning unit, a focal length control unit, a distance measuring unit, a temperature measuring unit, and a control unit; and, if necessary, further includes appropriately selected other units.

<<Laser Beam Emitting Unit>>

The laser beam emitting unit is not particularly limited and may be appropriately selected depending on the intended purpose, but is preferably a fiber-coupled laser diode since it can easily form a top-hat shaped light intensity distribution and can record an image with high visibility.

In order to record an image with high visibility, it is necessary to uniformize a light intensity distribution of laser beams. Typical laser beams have light intensity of Gaussian distribution, that is, have higher intensity at a central portion. When the thermoreversible recording medium is irradiated with such laser beams to record an image, a peripheral portion has lower contrast than that of the central portion, resulting in poor visibility. However, the fiber-coupled laser diode from which laser beams with the top-hat shaped light intensity distribution are emitted enables an image with high visibility to be recorded.

In the case of using the typical laser beams having light intensity of Gaussian distribution, a spot diameter is increased while keeping Gaussian distribution as the focal point is away from the thermoreversible recording medium in an optical axis direction. Thus, an image is recorded with a thicker line on the thermoreversible recording medium. In the case of using laser beams emitted from the fiber-coupled laser diode, the spot diameter is also increased as the focal point is away from the thermoreversible recording medium in the optical axis direction. However, a diameter at the central portion with higher intensity is not increased since the light intensity distribution approaches Gaussian distribution. Thus, a line width is less likely to be thick upon image recording.

Therefore, in the case where the focal point is away from the thermoreversible recording medium in the optical axis direction, laser beams emitted from the fiber-coupled laser diode is less likely to vary in energy for irradiating the thermoreversible recording medium than laser beam emitted from the typical laser. As a result, the fiber-coupled laser diode enables an image to be recorded on the thermoreversible recording medium with relatively stable contrast and line width, and high visibility.

Emitting power of laser beams to be emitted from the laser beam emitting unit is not particularly limited and may be appropriately selected depending on the intended purpose, so long as it can be controlled in accordance with instructions from the control unit. Therefore, a laser beam emitting unit capable of operating in a pulsed oscillation mode is preferably used since the emitting power can be easily controlled by varying at least one of a pulse period and a pulse duty ratio.

A wavelength of laser beams to be emitted from the laser beam emitting unit is not particularly limited and may be appropriately selected depending on the intended purpose, but the lower limit thereof is preferably 700 nm or longer, more preferably 720 nm or longer, particularly preferably 750 nm or longer. The laser beams having the lower limit of the wavelength falling within the above described preferable range are advantageous in that, in the visible light region, an image is not easily decreased in contrast upon recording on the thermoreversible recording medium, and the thermoreversible recording medium is less likely to be colored. In the ultraviolet region having shorter wavelengths, the thermoreversible recording medium is advantageously less likely to be deteriorated. The upper limit of the wavelength of the laser beams is preferably 1,600 nm or shorter, more preferably 1,300 mm or shorter, particularly preferably 1,200 nm or shorter. The laser beams having the upper limit of the wavelength falling within the above described preferable range are advantageous in that there is no need for a photothermal converting material having a high decomposition temperature and absorbing light having longer wavelengths in the case where an organic pigment is added to the thermoreversible recording medium as the photothermal converting material.

<<Laser Beam Scanning Unit>>

The laser beam scanning unit is not particularly limited and may be appropriately selected depending on the intended purpose, so long as it can scan laser beams, which is emitted from the laser beam emitting unit, over the thermoreversible recording medium. Examples thereof include a combination of a galvanometer and a mirror mounted on the galvanometer.

<<Focal Length Control Unit>>

The focal length control unit is not particularly limited and may be appropriately selected depending on the intended purpose, but preferably includes a lens system disposed between the laser beam emitting unit and the laser beam scanning unit, and configured to be able to vary a focal length of the laser beams.

A focal length control unit is configured to control a position of the lens system based on a distance between the thermoreversible recording medium and a laser beam emitting surface of the laser beam emitting unit (hereinafter referred to as "interwork distance") which has been measured by the distance measuring unit. The focal length control unit is configured to control the position of the lens system so as to defocus the laser beams on a position of the thermoreversible recording medium upon image erasing and so as to focus the laser beams on a position of the thermoreversible recording medium upon image recording.

<<Distance Measuring Unit>>

The distance measuring unit is not particularly limited and may be appropriately selected depending on the intended purpose, so long as it can measure the interwork distance. For example, it may be a ruler (scale) or a distance sensor.

Examples of the distance sensor include a non-contact distance sensor and a contact distance sensor. The contact distance sensor damages the thermoreversible recording medium to be measured and is difficult to measure the distance rapidly. Thus, the non-contact distance sensor is preferable. Among the non-contact distance sensors, a laser displacement sensor is preferable since it can rapidly and accurately measure the distance, and is inexpensive and small-sized.

Among the laser displacement sensors, in the case where the position of the lens system of the focal length control unit is corrected based on the interwork distance which has been measured, a laser displacement sensor capable of transmitting the measured result to the image processing apparatus (e.g., a laser displacement sensor manufactured by Panasonic Corporation) is preferable.

As for a position to be measured by the distance sensor and the number thereof, in the case where the thermoreversible recording medium is relatively flat, one position at a central portion of the thermoreversible recording medium corresponding to an average distance from the thermoreversible recording medium to the distance sensor is preferably measured from the viewpoints of simplified processing and high cost performance. On the other hand, in the case where the thermoreversible recording medium is greatly inclined, a plurality of positions are needed to be measured. Three or more positions are preferably measured. In this case, a three-dimensional incline of the thermoreversible recording medium is calculated based on the measured results at three or more positions to thereby correct the focal length.

<<Temperature Measuring Unit>>

The temperature measuring unit is not particularly limited and may be appropriately selected depending on the intended purpose, so long as it can measure at least one of the surface temperature of the thermoreversible recording medium and a temperature of an environment which is adjacent to the thermoreversible recording medium and under which the thermoreversible recording medium is irradiated with laser beams.

An environment under which the thermoreversible recording medium is irradiated with laser beams refers to a spatial environment inside the laser beam shielding cover disposed adjacent to the image processing apparatus. Note that, as used herein, among the temperatures of the spatial environment, a temperature measured immediately before erasing an image is referred to as an erasing environmental temperature, and a temperature measured after erasing the image but immediately before recording a new image is referred to as a recording environmental temperature.

The temperature measuring unit is not particularly limited and may be appropriately selected depending on the intended purpose, and examples thereof include a temperature sensor.

Examples of the temperature sensor include a surface temperature sensor and an environmental temperature sensor.

The surface temperature sensor is not particularly limited and may be appropriately selected depending on the intended purpose, so long as it can measure a surface temperature of the thermoreversible recording medium, but is preferably a radiation thermometer since it can measure the temperature in a non-contact manner.

The environmental temperature sensor is not particularly limited and may be appropriately selected depending on the intended purpose, so long as it can measure the erasing environmental temperature and the recording environmental temperature, but is preferably a thermistor since it can be used at low costs and can rapidly and accurately measure the temperature.

<<Control Unit>>

The control unit is configured to measure at least one of the surface temperature of the thermoreversible recording medium and the erasing environmental temperature before the beginning of the image erasing step to obtain a measured temperature value and to perform a temperature-based correction of the irradiating energy of laser beams to be emitted in the image erasing step and a temperature-based correction of the heating time with laser beams to be emitted in the image erasing step depending on the measured temperature value.

The control unit may also be configured to perform a temperature-based correction of the irradiating energy of laser beams to be emitted in the image recording step depending on at least one of the surface temperature of the thermoreversible recording medium and the recording environmental temperature measured by the temperature measuring unit after the completion of the image erasing step but before the beginning of the image recording step.

Note that, the control unit was described to perform the temperature-based correction depending on the surface temperature of the thermoreversible recording medium or the temperature of the spatial environment (the recording environmental temperature or the erasing environmental temperature), but not limited thereto. The surface temperature of the thermoreversible recording medium may be preferentially used since a position which is actually irradiated with laser beams can be measured accurately. Alternatively, both of the surface temperature of the thermoreversible recording medium and the temperature of the spatial environment may be measured and compared with each other to thereby determine which temperature is used.

When the thermoreversible recording medium is heated for a longer period of time in the image erasing step, the thermoreversible recording medium is held in a temperature under which an image can be erased for a longer period of time in spite of heat dissipation. However, the irradiating energy of laser beams required to erase the image is increased. Therefore, the irradiating energy of laser beams is preferably corrected depending on the heating time.

The temperature-based correction of the irradiating energy is not particularly limited and may be appropriately selected depending on the intended purpose. For example, the control unit may calculate the emitting power of laser beams based on the measured temperature value and instruct the laser beam emitting unit to record an image at the emitting power calculated above. Specifically, the irradiating energy is corrected so that the emitting power is decreased at a high measured temperature value or the emitting power is increased at a low measured temperature value. Thus, the temperature-based correction of the irradiating energy is performed.

The temperature-based correction of the heating time is performed by calculating the heating time or reading out the heating time from a memory (not illustrated) based on the measured temperature value, and instructing the laser beam emitting unit to start to record an image for the heating time. For example, the heating time is corrected so that the heating time is prolonged at a low measured temperature value or the heating time is shortened at a high measured temperature value.

When the heating time in the image erasing step is long, the image can be normally erased by increasing the irradiating energy of laser beams.

<<Other Units>>

The other units are not particularly limited and may be appropriately selected depending on the intended purpose. For example, an apparatus control unit may be used.

The apparatus control unit is not particularly limited and may be appropriately selected depending on the intended purpose, so long as it can entirely control the image processing apparatus and can control the operation of each of the above steps and units. Examples thereof include devices such as a sequencer and a computer. Note that, the apparatus control unit may be included in the control unit.

<Other Sections>

The image processing apparatus has the same basic configuration as commonly used laser marker devices. Therefore, examples of the other sections include a power supply control section and a program section.

The power supply control section includes a power supply for driving a light source for exciting a laser medium, a power supply for driving a galvanometer, and a power supply for cooling, for example, a Peltier-element.

The program section includes an information setting unit such as touch panel and a key board. The program section is configured to input conditions such as an irradiating area, emitting power and scanning velocity of laser beams and to create and edit, for example, characters to be recorded for image recording and erasing.

Note that, the image processing apparatus also includes, for example, a conveyer for the thermoreversible recording medium, a controller for the conveyer, and a monitor (touch panel).

<Image Erasing Step>

The image erasing step is not particularly limited and may be appropriately selected depending on the intended purpose, so long as it can irradiate the thermoreversible recording medium with laser beams to heat the thermoreversible recording medium, to thereby erase an image which has been recorded on the thermoreversible recording medium. The irradiating energy of the laser beams to be emitted in the image erasing step and the heating time are subjected to the temperature-based correction by the control unit.

A scanning operation for image erasing is not particularly limited and may be appropriately selected depending on the intended purpose. Examples thereof include an operation in laser beams having a large spot diameter (hereinafter referred to as circular beams) are two-dimensionally scanned over the thermoreversible recording medium in the X- and Y-axis directions to thereby erase an image and an operation in which linear beams are scanned over the thermoreversible recording medium in one direction to thereby erase an image. Of these, preferable the operation in which circular beams are scanned to thereby erase an image since light intensity distribution, shape of beams, and a spot diameter can be easily changed and the heating time can be prolonged while preventing the entire erasing time from being prolonged.

The operation in which circular beams are scanned to thereby erase is not particularly limited and may be appropriately selected depending on the intended purpose. For example, the operations may be those illustrated in FIGS. 5 to 7. Note that, in FIGS. 5 to 7, a solid-line arrow represents an operation for erasing an image using the circular beams (erasing operation), and a broken-line arrow represents a jumping operation performed between the erasing operations (idling operation).

Figure 5:
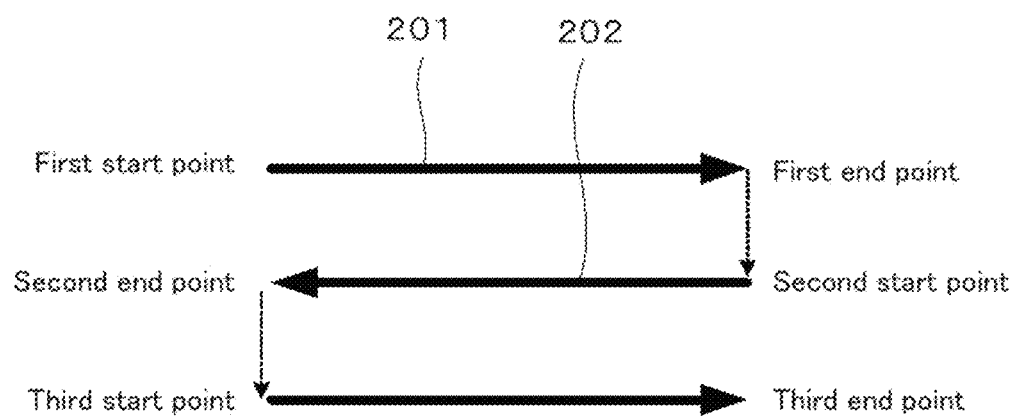
FIG. 5 is a schematic diagram illustrating one exemplary circular beam scanning operation in an image erasing method.

FIG. 5 illustrates a scanning operation in which the circular beams are scanned in opposite directions alternately to thereby erase an image. Firstly, the circular beams are scanned from a first start point to a first end point to thereby erase an image on a first laser beam erased line 201. Next, the circular beams are idly run to a second start point adjacent to the first end point, and then scanned from the second start point to a second end point adjacent to the first start point in parallel with the first laser beam erased line 201, to thereby erase an image on a second laser beam erased line 202. This operation is repeated to erase an image on the thermoreversible recording medium.

Figure 6:
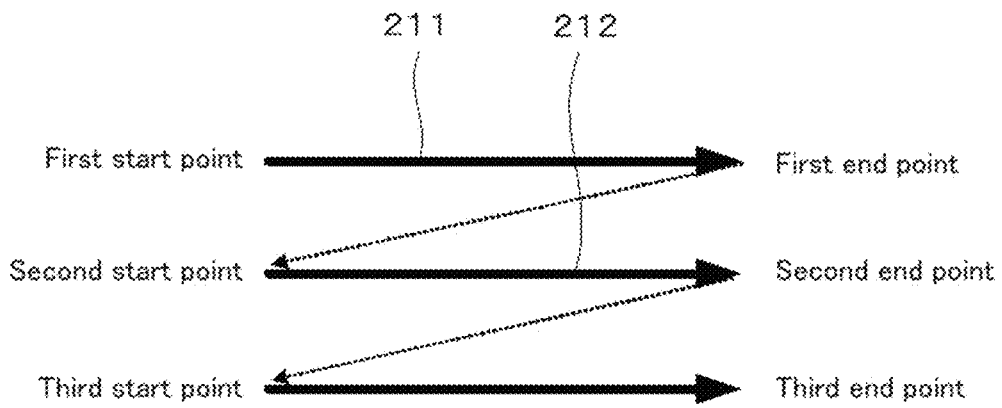
FIG. 6 is a schematic diagram illustrating another exemplary circular beam scanning operation in an image erasing method.

FIG. 6 illustrates a scanning operation in which the circular beams are scanned in one direction to thereby erase an image. Firstly, the circular beams are scanned from a first start point to a first end point to thereby erase an image on a first laser beam erased line 211. Next, the circular beams are idly run to a second start point adjacent to the first end point, and then scanned from the second start point to a second end point adjacent to the first end point in parallel with the first laser beam erased line 211, to thereby erase an image on a second laser beam erased line 212. This operation is repeated to erase an image on the thermoreversible recording medium.

Figure 7:
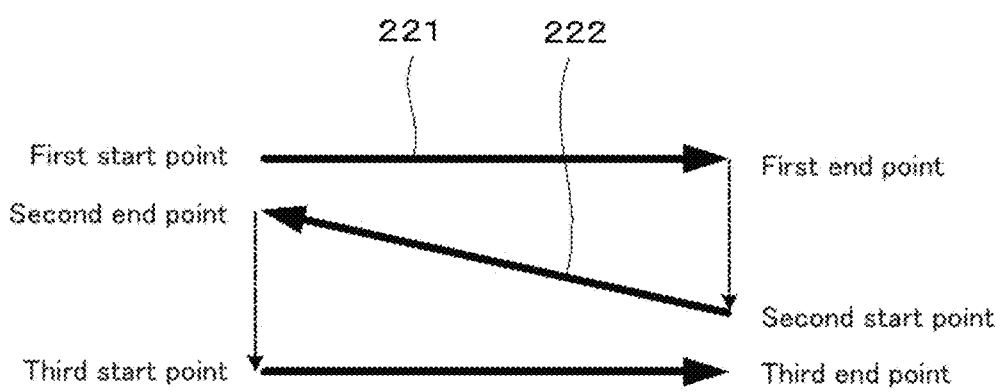
FIG. 7 is a schematic diagram illustrating another exemplary circular beam scanning operation in an image erasing method.

FIG. 7 illustrates a scanning operation in which the circular beams are scanned in opposite directions alternately to thereby erase an image, which is similar to one illustrated in FIG. 5. Firstly, the circular beams are scanned from a first start point to a first end point to thereby erase an image on a first laser beam erased line 221. Next, the circular beams are idly run to a second start point adjacent to the first end point but farther apart from the first end point than the second start point illustrated in FIG. 5, and then scanned from the second start point to a second end point located on a line inclined from a line in parallel with the first laser beam erased line 221 toward the first start point, to thereby erase an image on a second laser beam erased line 222. This operation is repeated to erase an image on the thermoreversible recording medium.

In the image erasing step in which the thermoreversible recording medium is irradiated with circular beams to heat the thermoreversible recording medium to thereby erase an image, the circular beams are scanned so that a plurality of laser beam erased lines are spaced apart from each other at a predetermined interval but overlapped with each other, to thereby irradiate the entire surface of the thermoreversible recording medium with the circular beams, in order to uniformize the irradiating energy. As a result, it takes a long time to erase the image. Therefore, among the scanning operations illustrated in FIGS. 5 to 7, preferable are the operations illustrated in FIGS. 5 and 7 since the image can be erased in a shorter time. The operation illustrated in FIG. 7 is more preferable since an effect of heat accumulated at turning portions can be reduced and high durability for repeated use can be achieved.

The scanning operation illustrated in FIG. 6 takes more time to erase the image than the scanning operations illustrated in FIGS. 5 and 7, but can achieve high durability for repeated use since less heat is accumulated at turning portions than that in the operation illustrated in FIG. 7 and excessive energy is not applied to the thermoreversible recording medium.

With the operation in which the circular beams are scanned to thereby erase an image, the image can be selectively erased only on a certain region of the thermoreversible recording medium. Therefore, in the case where an image to be rewritten and an image not to be rewritten are mixed, a time for which the circular beams are scanned and thus a time for image erasing can be shortened than the case where an image on the entire surface of the thermoreversible recording medium is erased since only the image to be rewritten has to be erased. Note that, also in the case of image recording, a time for image recording can be shortened.

In addition, with the operation in which the circular beams are scanned to thereby erase an image, an order of erasing images can be controlled. Therefore, in the case where an image in which heat tends to be accumulated upon image recording (e.g., barcode) is rewritten, this image can be set to be erased early to thereby ensure a time for which heat for image erasing is dissipated to a surrounding region, leading to a reduced effect of accumulated heat. This enables an image with high visibility and machine-readability to be recorded and can achieve high durability for repeated use.

<Image Recording Step>

The image recording step is not particularly limited and may be appropriately selected depending on the intended purpose, so long as it can irradiate the thermoreversible recording medium with laser beams to heat the thermoreversible recording medium, to thereby record an image on the thermoreversible recording medium. The irradiating energy of laser beams to be emitted in the image recording step is subjected to the temperature-based correction by the control unit.

<Controlling Step>

The controlling step may be suitably performed by the control unit. The controlling step includes the temperature-based correction of the irradiating energy of the circular beams to be emitted in the image erasing step, the temperature-based correction of the heating time with the circular beams, and the temperature-based correction of the irradiating energy of laser beams to be emitted in the image recording step; and, if necessary, further includes other processing. Note that, these temperature-based corrections are performed at proper timing for each correction.

<<Temperature-Based Correction of Irradiating Energy of Circular Beams to be Emitted in Image Erasing Step>>

The temperature-based correction of the irradiating energy of circular beams to be emitted in the image erasing step is not particularly limited and may be appropriately selected depending on the intended purpose. However, the temperature-based correction preferably includes measuring at least one of the surface temperature of the thermoreversible recording medium and the erasing environmental temperature before the beginning of the image erasing step to obtain a measured temperature value and correcting the irradiating energy depending on the measured temperature value.

The irradiating energy Ee of circular beams to be emitted in the image erasing step can be expressed as $Ee=(Pe \times re)/Ve$. The Pe, re, and Ve can be controlled to vary to thereby perform the correction.

Note that, Pe denotes emitting power of the circular beams to be emitted in the image erasing step, Ve denotes scanning velocity of the circular beams to be emitted in the image erasing step, and re denotes a spot diameter of the circular beams to be emitted in the image erasing step.

The irradiating energy Ee can also be expressed as $Ee=(Pe \times P)/Ve$. The Pe, P, and Ve can be controlled to vary to thereby perform the correction. Note that, P denotes a pitch width of the circular beams to be emitted in the image erasing step.

The control unit preferably further includes controlling the emitting power Pe of laser beams to be emitted for erasing an image which has been recorded on the thermoreversible recording medium depending on the measured temperature value.

A method for controlling the emitting power Pe is not particularly limited and may be appropriately selected depending on the intended purpose. Examples thereof include adjustment of peak power of circular beams, and adjustment of at least one of a pulse period and a pulse duty ratio in the case of pulsed laser irradiation.

Specifically, the temperature-based correction of the irradiating energy is performed by determining a correction amount of the pulse duty ratio from a temperature difference between the measured temperature value measured before the beginning of the image erasing step and the reference temperature of 25° C. using a correction factor of −0.9%/° C. and adjusting the emitting power Pe of the circular beams based on the correction amount. For example, in the case of the measured temperature value of 0° C., the temperature difference from the reference temperature of 25° C. was −25° C., so that the correction amount of the pulse duty ratio was determined as +22.5%. Then, the circular beams are emitted at the pulse duty ratio of 95.55% which was determined by multiplying the setting value of the pulse duty ratio at 25° C. of 78.0% by 1.225.

The emitting power Pe is not particularly limited and may be appropriately selected depending on the intended purpose. However, the lower limit thereof is preferably 5 W or greater, more preferably 7 W or greater, particularly preferably 10 W or greater. The emitting power Pe falling within the above described preferable range is advantageous in that an image can be erased in a shorter time and the emitting power Pe can be obtained sufficiently even in the shorter time and erasion failure is less likely to occur. The upper limit thereof is preferably 200 W or lower, more preferably 150 W or lower, particularly preferably 100 W or lower. The emitting power Pe falling within the above described preferable range is advantageous in that the image processing apparatus may not need to be upsized.

A method for controlling the scanning velocity Ve is not particularly limited and may be appropriately selected depending on the intended purpose. Examples thereof include a method in which the rotation speed of a motor for driving a scanning mirror in the laser beam scanning unit is controlled.

The scanning velocity Ve is not particularly limited and may be appropriately selected depending on the intended purpose. However, the lower limit thereof is preferably 100 mm/s or higher, more preferably 200 mm/s or higher, particularly preferably 300 mm/s or higher. The scanning velocity Ve falling within the above described preferable range is advantageous in terms of rapid image erasing. The upper limit thereof is preferably 20,000 mm/s or lower, more preferably 15,000 mm/s or lower, particularly preferably 10,000 mm/s or lower. The scanning velocity Ve falling within the above described preferable range is advantageous in terms of uniform image erasing.

The control unit preferably further includes controlling the spot diameter re of laser beams to be emitted for erasing an image which has been recorded on the thermoreversible recording medium depending on the measured temperature value.

A method for controlling the spot diameter re is not particularly limited and may be appropriately selected depending on the intended purpose. Examples thereof include a method in which the focal length control unit is used to control the focal length to defocus.

The spot diameter re is not particularly limited and may be appropriately selected depending on the intended purpose. However, the lower limit thereof is preferably 1.0 mm or larger, more preferably 2.0 mm or larger, particularly preferably 3.0 mm or larger. The spot diameter re falling within the above described preferable range is advantageous in that an image can be erased in a shorter time. The upper limit thereof is preferably 20.0 mm or smaller, more preferably 16.0 mm or smaller, particularly preferably 12.0 mm or smaller. The spot diameter re falling within the above described preferable range is advantageous in that the irradiating energy Ee can be obtained sufficiently and erasion failure is less likely to occur.

A pitch width P for scanning laser beams is not particularly limited and may be appropriately selected depending on the intended purpose. However, the upper limit thereof is preferably 6 mm or shorter, more preferably 4 mm or shorter, particularly preferably 3 mm or shorter. The lower limit thereof is preferably 0.3 mm or longer, more preferably 0.5 mm or longer, particularly preferably 0.8 mm or longer. The pitch width P falling within the above described preferable range is advantageous in that the heating time for erasing an image can be properly controlled, irradiating energy required to erase the image can be decreased, and the image can be erased in a shorter time.

<<Temperature-Based Correction of Heating Time in Image Erasing Step>>

The temperature-based correction of the heating time in the image erasing step is not particularly limited and may be appropriately selected depending on the intended purpose. However, the temperature-based correction preferably includes measuring at least one of the surface temperature of the thermoreversible recording medium and the erasing environmental temperature before the beginning of the image erasing step to obtain a measured temperature value and correcting the heating time depending on the measured temperature value.

The heating time te in the image erasing step can be expressed as $te=(re^2 \times We)/Ve$. The re, We, and Ve can be controlled to vary to thereby perform the correction.

Note that, We denotes the pitch width in the image erasing step.

The heating time is not particularly limited and may be appropriately selected depending on the intended purpose. The lower limit thereof is preferably 3 ms or longer, more preferably 6 ms or longer, particularly preferably 10 ms or longer. The heating time falling within the above described preferable range is advantageous in terms of an improved erasing property (a decreased unerased density) especially under a low temperature environment. The upper limit thereof is preferably 100 ms or shorter, more preferably 70 ms or shorter, particularly preferably 50 ms or shorter. The heating time falling within the above described preferable range is advantageous in that irradiating energy required to erase an image can be decreased and the image can be erased in a short time.

<<Temperature-Based Correction of Irradiating Energy of Laser Beams to be Emitted in Image Recording Step>>

The temperature-based correction of the irradiating energy of laser beams to be emitted in the image recording step is not particularly limited and may be appropriately selected depending on the intended purpose. However, the temperature-based correction preferably includes measuring at least one of the surface temperature of the thermoreversible recording medium and the recording environmental temperature during the period from the completion of the image erasing step to the beginning of the image recording step to obtain a measured temperature value and correcting the irradiating energy depending on the measured temperature value.

The irradiating energy Ew of laser beams to be emitted in the image recording step can be expressed as $Ew=(Pw \times rw)/Vw$ in the same manner as the irradiating energy Ee. The Pw, rw, and Vw can be controlled to vary to thereby perform the correction.

Note that, Pw denotes emitting power of laser beams to be emitted in the image recording step, Vw denotes scanning velocity of laser beams to be emitted in the image recording step, and rw denotes a spot diameter of laser beams to be emitted in the image recording step.

A method for controlling the emitting power Pw is not particularly limited and may be appropriately selected depending on the intended purpose. Examples thereof include adjustment of peak power of laser beams, and adjustment of at least one of a pulse period and a pulse duty ratio in the case of pulsed laser irradiation.

Specifically, the temperature-based correction of the irradiating energy Ew in the image recording step is performed by determining a correction amount of the pulse duty ratio from a temperature difference between the measured temperature value and the reference temperature of 25° C. using a correction factor of −0.4%/° C. and adjusting the emitting power Pw of laser beams based on the correction amount. For example, in the case of the measured temperature value of 0° C., the temperature difference from the reference temperature of 25° C. was −25° C., so that the correction amount of the pulse duty ratio was determined as +10.0%. Then, laser beams are emitted at the pulse duty ratio of 29.7% which was determined by multiplying 27.0% by 1.10 assuming that the setting value of the pulse duty ratio at 25° C. is 27.0%.

The emitting power Pw is not particularly limited and may be appropriately selected depending on the intended purpose. However, the lower limit thereof is preferably 1 W or greater, more preferably 3 W or greater, particularly preferably 5 W or greater. The emitting power Pw falling within the above described preferable range is advantageous in that an image can be erased in a shorter time and the emitting power Pw can be obtained sufficiently even in the shorter time. The upper limit thereof is preferably 200 W or lower, more preferably 150 W or lower, particularly preferably 100 W or lower. The emitting power Pw falling within the above described preferable range is advantageous in that the image processing apparatus may not need to be upsized.

A method for controlling the scanning velocity Vw is not particularly limited and may be appropriately selected depending on the intended purpose. Examples thereof include a method in which the rotation speed of a motor for driving a scanning mirror in the laser beam scanning unit is controlled.

The scanning velocity Vw is not particularly limited and may be appropriately selected depending on the intended purpose. However, the lower limit thereof is preferably 300 mm/s or higher, more preferably 500 mm/s or higher, particularly preferably 700 mm/s or higher. The scanning velocity Vw falling within the above described preferable range is advantageous in that an image can be recorded in a short time. The upper limit thereof is preferably 15,000 mm/s or lower, more preferably 10,000 mm/s or lower, particularly preferably 8,000 mm/s or lower. The scanning velocity Vw falling within the above described preferable range is advantageous in that the scanning velocity Vw can be easily controlled and a uniform image can be easily formed.

A method for controlling the spot diameter rw is not particularly limited and may be appropriately selected depending on the intended purpose. Examples thereof include a method in which the focal length control unit is used to control the focal length to defocus.

The spot diameter rw is not particularly limited and may be appropriately selected depending on the intended purpose. However, the lower limit thereof is preferably 0.02 mm or longer, more preferably 0.1 mm or longer, particularly preferably 0.15 mm or longer. The spot diameter rw falling within the above described preferable range is advantageous in that an image can be prevented from being recorded with thinner lines, so that visibility is less likely to decrease. The upper limit thereof is preferably 2.0 mm or shorter, more preferably 1.5 mm or shorter, particularly preferably 1.0 mm or shorter. The spot diameter rw falling within the above described preferable range is advantageous in that an image can be prevented from easily being recorded with thicker lines and adjacent lines are not overlaid, enabling a small-sized image to be recorded.

<Other Steps>

The other steps are not particularly limited and may be appropriately selected depending on the intended purpose. Examples thereof include an apparatus control step.

The apparatus control step is a step of controlling each of the above steps and may be suitably performed by the apparatus control unit.

<Thermoreversible Recording Medium>

A shape, structure, and size of the thermoreversible recording medium are not particularly limited and may be appropriately selected depending on the intended purpose.

The thermoreversible recording medium includes a support, a thermoreversible recording layer on the support; and, if necessary, may further include appropriately selected other layers, such as a hollow layer, a first oxygen barrier layer, a photothermal converting layer, a second oxygen barrier layer, a UV ray absorbing layer, a back layer, a protective layer, an intermediate layer, an under layer, an adhesive layer, a bonding agent layer, a coloring layer, an air layer, and a light reflective layer. Each of these layers may have a single layer structure or a laminate structure. However, in order to reduce energy loss of the laser beams having a certain wavelength to be emitted, a layer disposed on the photothermal converting layer is preferably composed of a material that is less likely to absorb light having the certain wavelength.

One aspect of a layer configuration of the thermoreversible recording medium includes the hollow layer and the thermoreversible recording layer on (the support+the first oxygen barrier layer), and further includes the intermediate layer, the second oxygen barrier layer, and the UV ray absorbing layer in this order on the thermoreversible recording layer.

Support

A shape, structure, and size of the support are not particularly limited and may be appropriately selected depending on the intended purpose.

Examples of the shape include a plate shape.

The structure may be a single layer structure or a laminate structure.

The size may be appropriately selected depending on the size of the thermoreversible recording medium.

Thermoreversible Recording Layer

The thermoreversible recording layer contains a leuco dye, which is an electron-donating coloring compound, and a reversible color developer, which is an electron-accepting compound. The thermoreversible recording layer is a configured to reversibly change in its color tone depending on a heating temperature and a cooling time after heating. The thermoreversible recording layer contains a binder resin and a photothermal converting material; and, if necessary, may further contain other components.

The leuco dye, which is an electron-donating coloring compound that reversibly changes in its color tone upon application of heat, and the reversible color developer, which is an electron-accepting compound, are materials which can realize reversible visual change according to change in temperature. The leuco dye and the reversible color developer can reversibly change between a colored state and a decolored state according to a heating temperature and a cooling speed after heating.

Leuco Dye

The leuco dye itself is a colorless or light-colored dye precursor. The leuco dye is not particularly limited and may be appropriately selected from those known in the art. Examples thereof include a triphenylmethane phthalide leuco compound, a triallyl methane leuco compound, a fluoran leuco compound, a phenothiazine leuco compound, a thiofluoran leuco compound, a xanthene leuco compound, an indophthalyl leuco compound, a spiropyran leuco compound, an azaphthalide leuco compound, a couromemopyrazole leuco compound, a methine leuco compound, a rhodamine anilinolactam leuco compound, a rhodamine lactam leuco compound, a quinazoline leuco compound, a diazaxanthene leuco compound, and a bislactone leuco compound. Of these, a fluoran leuco dye and a phthalide leuco dye are particularly preferable from the viewpoints of excellent coloring-decoloring properties, hue, and preservability.

Reversible Color Developer

The reversible color developer is not particularly limited and may be appropriately selected depending on the intended purpose, so long as it can be reversibly colored and decolored using heat. Suitable examples thereof include a compound containing at least one of (1) a structure having an ability of coloring the leuco dye (e.g., a phenolic hydroxyl group, a carboxylic acid group, and a phosphoric acid group) and (2) a structure for controlling aggregation force between molecules (e.g., a structure linked with a long-chain hydrocarbon group) in a molecule thereof. Note that, the long-chain hydrocarbon group may be linked via a bivalent or higher linking group containing a hetero atom, and the long-chain hydrocarbon group itself may contain at least one of the linking group as described above and an aromatic group.

The (1) structure having an ability of coloring the leuco dye is particularly preferably a phenolic structure.

The (2) structure for controlling aggregation force between molecules is preferably a long-chain hydrocarbon group having 8 or more carbon atoms, more preferably 11 or more carbon atoms. The long-chain hydrocarbon group has preferably 40 or less carbon atoms, more preferably 30 or less carbon atoms.

The electron-accepting compound (reversible color developer) is preferably used in combination with a compound containing at least one of a —NHCO— group and an —OCONH— group in a molecule thereof as a decoloration accelerator. This is because use of these compounds in combination can induce an intermolecular interaction between the decoloration accelerator and the reversible color developer in the process for shifting toward the decolored state, to thereby improve a coloring and decoloring property.

The decoloration accelerator is not particularly limited and may be appropriately selected depending on the intended purpose.

The thermoreversible recording layer may contain a binder resin and a photothermal converting material; and, if necessary, further contain various additives for improving or controlling coatability or a coloring and decoloring property of the thermoreversible recording layer. Examples of the additives include a surfactant, a conducting agent, filler, an antioxidant, a photostabilizer, a coloring stabilizer, and a decoloring accelerator.

Binder Resin

The binder resin is not particularly limited and may be appropriately selected depending on the intended purpose, so long as it can bind the thermoreversible recording layer on the support. Conventionally known resins can be used alone or in combination as the binder resin. Of these, preferable is a resin curable by heat, UV rays, or electron beams from the viewpoint of improvement in durability for repeated use, and particularly preferable is a thermosetting resin cross-linked using an isocyanate compound as a cross-linking agent.

Photothermal Converting Material

The photothermal converting material is contained in a thermoreversible recording layer to highly efficiently absorb laser beams to thereby generate heat. The photothermal converting material is added depending on a wavelength of the laser beams.

The photothermal converting material is roughly classified into an inorganic material and an organic material.

Examples of the inorganic material include: carbon black; a metal (e.g., Ge, Bi, In, Te, Se, and Cr) or a semimetal; and alloy thereof. These are shaped in a layered form by a vacuum vapor deposition method or by adhering a particulate material with, for example, a resin.

The organic material may be appropriately selected from various dyes depending on a wavelength of light to be absorbed. In the case where a laser diode is used as a beam source, a near infrared-absorbing pigment having an absorption peak in a wavelength range of from 700 nm through 1,500 nm is used. Specific examples thereof include a cyanine pigment, a quinone pigment, a quinoline derivative of indonaphthol, a phenylene diamine nickel complex, and a phthalocyanine compound. A photothermal converting material being excellent in heat resistance is preferably selected for repeated image processing. In this point of view, the phthalocyanine compound is particularly preferable.

The near infrared-absorbing pigment may be used alone or in combination.

In the case where the photothermal converting layer is disposed, the photothermal converting material is typically used in combination with a resin. The resin used for the photothermal converting layer is not particularly limited and may be appropriately selected from those known in the art, so long as the resin can hold the inorganic material or the organic material. Of these, a thermoplastic resin or a thermosetting resin is preferable. Those usable as a binder resin in the thermoreversible recording layer can be suitably used. Of these, preferable is a resin curable by heat, UV rays, or electron beams from the viewpoint of improvement in durability for repeated use, and particularly preferable is a thermally cross-linkable resin cross-linked using an isocyanate compound as a cross-linking agent.

First and Second Oxygen Barrier Layers

The first and second oxygen barrier layers are not particularly limited and may be appropriately selected depending on the intended purpose, so long as they can prevent oxygen from entering the thermoreversible recording layer and prevent photodeterioration of the leuco dye in the thermoreversible recording layer, but preferably respectively disposed on top and bottom surfaces of the thermoreversible recording layer. That is, it is preferable that the first oxygen barrier layer be disposed between the support and the thermoreversible recording layer, and the second oxygen barrier layer be disposed on the second thermoreversible recording layer.

Protective Layer

The protective layer is not particularly limited and may be appropriately selected depending on the intended purpose. The protective layer is disposed on the thermoreversible recording layer for the purpose of protecting the thermoreversible recording layer. The protective layer may be provided in one or more layers, but is preferably disposed on an externally exposed outermost surface.

UV Ray Absorbing Layer

The UV ray absorbing layer is not particularly limited and may be appropriately selected depending on the intended purpose. The UV ray absorbing layer is preferably disposed on an a surface of the thermoreversible recording layer opposite to a surface where the support is disposed, for the purpose of preventing erasion failure of the leuco dye in the thermoreversible recording layer resulting from coloration and photodeterioration by the action of UV rays. This can improve light resistance of the recording medium. Preferably, a thickness of the UV ray absorbing layer is appropriately selected so that the UV ray absorbing layer absorbs UV rays of 390 nm or shorter.

Intermediate Layer

The intermediate layer is not particularly limited and may be appropriately selected depending on the intended purpose. The intermediate layer is preferably disposed between the thermoreversible recording layer and the protective layer for the purpose of improving adhesion between the thermoreversible recording layer and the protective layer, preventing deterioration of the thermoreversible recording layer due to application of the protective layer, and preventing the additives contained in the protective layer from migrating into the thermoreversible recording layer. This can improve preservability of a colored image.

Under Layer

The under layer is not particularly limited and may be appropriately selected depending on the intended purpose, so long as it can effectively utilizing applied heat to thereby increase sensitivity, improve adhesion between the support and the thermoreversible recording layer, or prevent permeation of a material contained in the thermoreversible recording layer into the support. For example, the under layer may be disposed between the thermoreversible recording layer and the support. The under layer contains hollow particles and optionally a binder resin; and, if necessary, further contains other components.

Back Layer

The back layer is not particularly limited and may be appropriately selected depending on the intended purpose. The back layer may be disposed on a surface of the support opposite to a surface where the thermoreversible recording layer is disposed, for the purpose of preventing the thermoreversible recording medium from curling or charging, and improving conveyability of the thermoreversible recording medium. The back layer contains a binder resin; and, if necessary, may further contain other components, such as filler, conductive filler, a lubricant, and a color pigment.

Adhesive Layer or Bonding Agent Layer

The adhesive layer or bonding agent layer is not particularly limited and may be appropriately selected depending on the intended purpose. For example, the adhesive layer or bonding agent layer may be disposed on a surface of the support opposite to a surface where the thermoreversible recording layer is disposed, to thereby use the thermoreversible recording medium as a thermoreversible recording label.

(Conveyer Line System)

A conveyor line system according to the present invention includes the image erasing apparatus using the thermoreversible recording medium; and, if necessary, further includes other apparatuses.

The conveyor line system is configured to transmit management information of a conveying container to the image processing apparatus for the purpose of managing the conveying container (e.g., returnable container employed in a physical distribution system). When the image processing apparatus receives the management information, the image processing apparatus erases an image on the thermoreversible recording medium attached on the conveying container with laser beams in a non-contact manner and record a new image based on the management information to thereby perform rewriting. This eliminates a need for attaching and peeling off a label. An image on the thermoreversible recording medium is rewritten while moving the conveying container (e.g., a cardboard box and a plastic container) on a belt conveyer. This eliminates a need to stop the line, leading to shortened shipping time.

In the conveyor line system, for example, one sheet of the thermoreversible recording medium is attached on one conveying container and a predetermined number or more of the thermoreversible recording medium (the conveying container) have to be rewritten per day. Generally, throughput of 1,200 containers or more per hour is required. In other words, one conveying container should be processed for 3.0 seconds or shorter on average. However, out of the 3.0 seconds, it takes 0.6 seconds to convey the conveying container to a position at which laser beams are emitted for erasing and recording an image. Therefore, a period of time actually available for rewriting is 2.4 seconds or shorter per container on average except for the conveying time.

The conveyor line system should satisfy the above requirement for rewriting time and keep quality of an image to be rewritten within the operating temperature in a range of 0° C. or higher but 35° C. or lower.

The conveyor line system is often located in, for example, a platform in a truck terminal exposed to the air, where an ambient temperature tends to be suddenly decreased to an unexpected level during the early morning in winter.

Specifically, when the erasing environmental temperature was measured in winter (from December to February), the temperature was lower than 0° C. in a range of from 1% through 8% of the period of time from 7:00 AM through 10:00 AM. Thus, the erasing environmental temperature may be suddenly decreased to an unexpected level for a short time. Note that, the environment under which an image is erased and recorded with laser beams is shielded by a laser beam shielding cover, so that heat generated from a motor is accumulated within the laser beam shielding cover through continuous operation of a conveyer. Therefore, the erasing environmental temperature is low only for a short time.

Therefore, when at least one of the erasing environmental temperature and the surface temperature of the thermoreversible recording medium is lower than 0° C., the heating time may be controlled to be prolonged. Then, the time for holding the thermoreversible recording medium within the decoloring temperature range can be ensured, so that the unerased density can be prevented from increasing.

Even when the measured temperature value is suddenly increased to lower than 0° C., the rewriting processing time is longer than 2.4 seconds per container only for a short time. Therefore, the rewriting processing time can be kept to 2.4 seconds or shorter on average throughout the day by shortening the rewriting processing time at 0° C. or higher to be 2.4 seconds or shorter per container.

An image to be written in the conveyor line system is not particularly limited and may be appropriately selected depending on the intended purpose, so long as it can provide information. Examples of the image include a character, a symbol, a graphic, and an optical information code. Of these, the optical information code is preferably included.

The optical information code is not particularly limited and may be appropriately selected depending on the intended purpose. Examples thereof include a barcode and a QR code (registered trademark). Of these, the image is preferably the barcode in terms of possibility of reading information rapidly.

Note that, in the conveyor line system, in the case where the image includes the barcode, the barcode may be read after the image recording step in order to verify whether the barcode image is properly recorded or whether information included in the barcode is correct.

When the barcode is erased, the unerased image may cause reading error of the barcode, potentially leading to low image rewriting speed.

The unerased density can be measured by a portable spectrophotometer X-RITE 939 (manufactured by X-Rite Inc.). In this case, an erased solid image density, which is density of a region on which a solid image has been recorded and then erased, and a background density, which is density of a region on which no image has been recorded (i.e., background portion), are measured, and then the background density is subtracted from the erased solid image density, which is determined as the unerased density to be evaluated. The unerased density is preferably 0.03 or less.

<Other Apparatuses>

The other apparatuses is not particularly limited and may be appropriately selected depending on the intended purpose. Examples thereof include a conveyer line configured to convey the conveying container, an image information controller, and an information reader configured to read a formed image.

The conveyor line system according to the present invention is suitable for a physical distribution management system, a delivery management system, a storage management system, and a process management system in a factory.

One exemplary image forming apparatus according to the present invention will now be described referring to figures.

Note that, the number, position, and shape of the following constituent members are not limited to the embodiments described below, and preferable number, position, and shape of the constituent members in the present invention may be used.

FIG. 1 is a schematic diagram illustrating one exemplary image processing apparatus according to the present invention.

In an optical system of the image processing apparatus illustrated in FIG. 1, laser beams emitted by a laser beam source 11 are collimated by a collimator lens 12b, enter a diffusing lens 16 serving as the focal length control unit, are condensed by a condenser lens 18, and then focused on a position that varies depending on a position, in a laser beam emitted direction, of the diffusing lens 16. The diffusing lens 16 is mounted on a lens position control mechanism 17 and is movable in the laser beam emitted direction. The lens position control mechanism 17 is movable at high speed based on pulse motor control, and can control the focal length at high speed.

Figure 2:
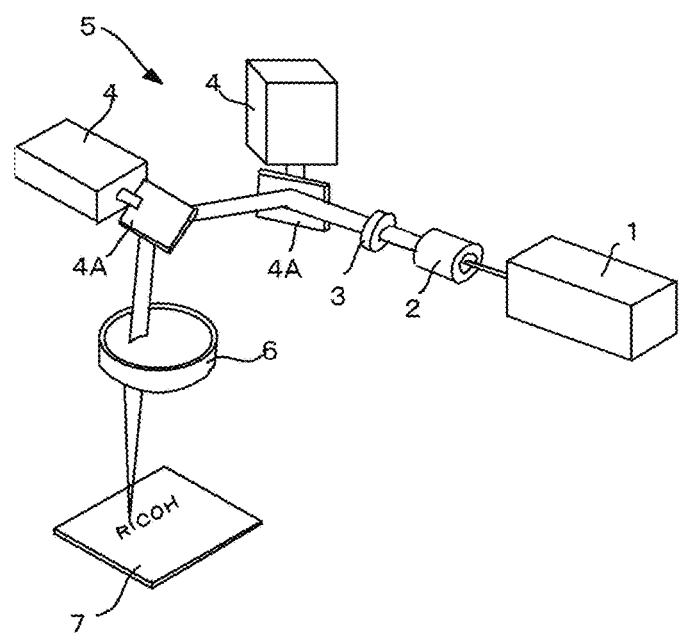
FIG. 2 is a schematic diagram illustrating another exemplary image processing apparatus.

FIG. 2 is a schematic diagram illustrating another exemplary image processing apparatus according to the present invention. This image processing apparatus illustrated in FIG. 2 includes a laser oscillator 1, a collimator lens 2, a focus position control mechanism 3, a scanning section 5, and a protective glass 6.

The laser oscillator 1 is necessary for obtaining highly directional laser beams having high light intensity. In the case of using the laser oscillator, only laser beams in an optical axis direction are selectively amplified, so that highly directional laser beams are emitted from an emitting power mirror.

The scanning section 5 includes galvanometers 4 and mirrors 4A mounted on the galvanometers 4. The scanning section 5 scans the laser beams emitted from the laser oscillator 1 with two mirrors 4A for the X axis direction and Y axis direction that are mounted on the galvanometer 4 while being rotated at high speed, to thereby perform image recording and image erasing on a thermoreversible recording medium 7.

An image recording and image erasing mechanism now will be described taking as an example a thermoreversible recording medium containing a leuco dye and a reversible color developer referring to FIGS. 3A and 3B.

Figure 3A:
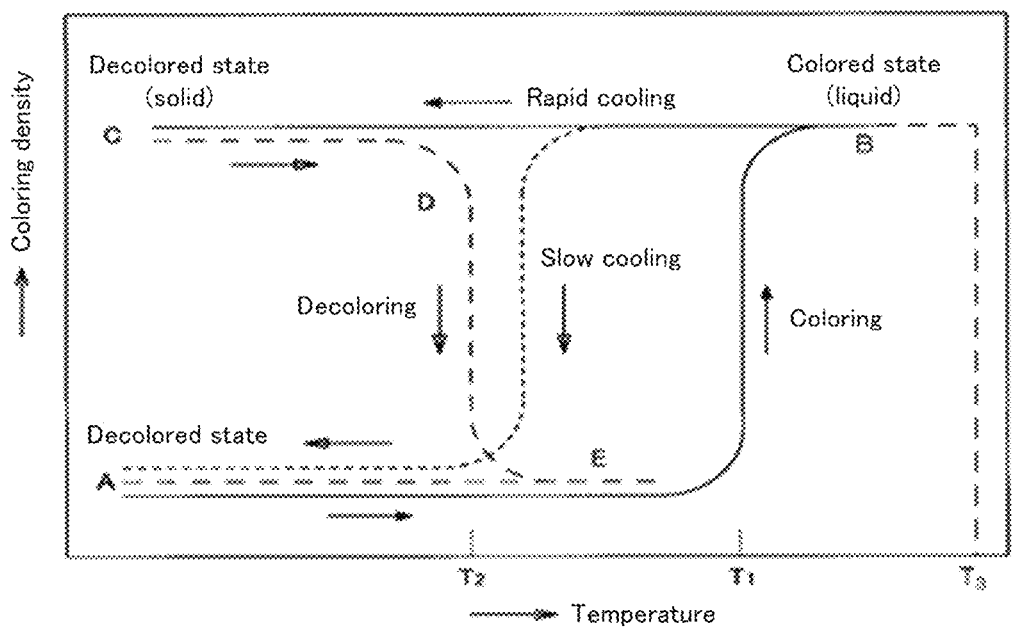
FIG. 3A is a graph illustrating a coloring-decoloring property of a thermoreversible recording medium.
Figure 3B:
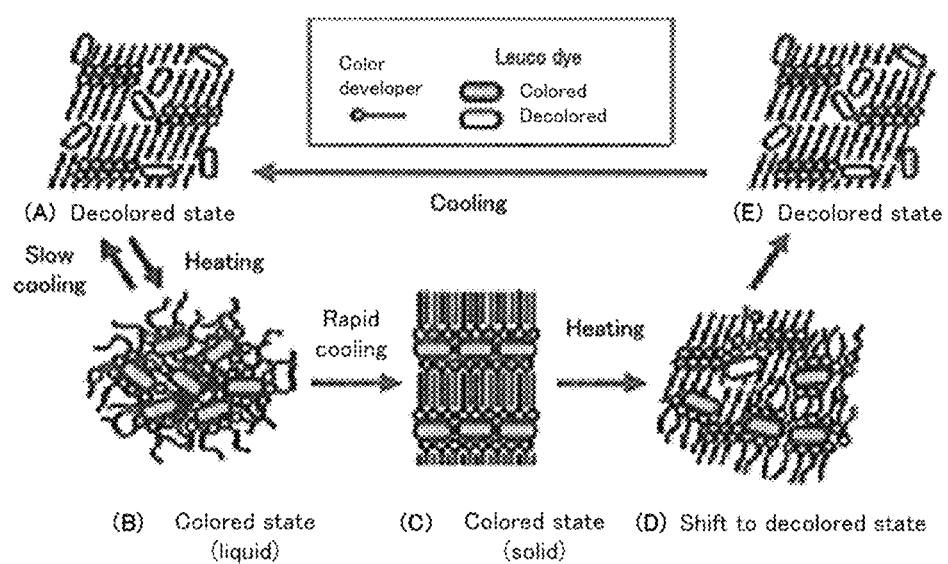
FIG. 3B is a schematic explanatory diagram illustrating a coloring-decoloring mechanism of a thermoreversible recording medium.

FIG. 3A is a graph illustrating a coloring-decoloring property of a thermoreversible recording medium and illustrates one exemplary temperature vs. coloring density change curve of the thermoreversible recording medium that includes a thermoreversible recording layer composed of a resin, and the leuco dye and the reversible color developer contained therein. FIG. 3B is a schematic explanatory diagram illustrating a coloring-decoloring mechanism of a thermoreversible recording medium and illustrates a coloring-decoloring mechanism in which the thermoreversible recording medium reversibly changes between a colored state and a decolored state by the action of heat.

In FIG. 3A, as the recording layer that is initially in a decolored state (A) is heated, the leuco dye and the reversible color developer are melted and mixed with each other at a melting temperature T1, so that the layer develops a color and turns into a melt colored state (B). By cooling rapidly the layer in the melt colored state (B), the layer can be cooled to room temperature while keeping it in the colored state, to thereby turn into a colored state (C) in which the developed color is stabilized. Whether this colored state can be obtained depends on a cooling rate from the melt colored state. In the case of slowly cooling, decoloring occurs in the process of cooling, so that the recording layer turns into the same decolored state (A) as the initial state, or a state in which the color density is relatively lower than that of the colored state (C) obtained through rapid cooling. On the other hand, in the case of heating again from the colored state (C), decoloring occurs (from D to E) at a temperature T2 lower than the coloring temperature. Then, when the layer is cooled from this state, it returns to the decolored state (A) as the initial state.

The colored state (C) obtained through rapid cooling from the melted state is a state in which the leuco dye molecules and the reversible color developer molecules have been mixed so as to be contact and react with each other, where they often form a solid state. In this state, the melted mixture (i.e., colored mixture) of the leuco dye and the reversible color developer has crystallized while being kept in the colored state. This state is believed to stabilize the developed color. On the other hand, a decolored state is a state in which the leuco dye and the developer are phase-separated, where molecules of at least one of the leuco dye and the reversible color developer have aggregated and formed a domain or have crystallized. The leuco dye and the reversible color developer are believed to be separated from each other through the aggregation or crystallization to thereby be stabilized. In many cases, as described above, the leuco dye and the reversible color developer are phase-separated and the reversible color developer is crystallized, leading to more complete decoloring.

In both of decoloring caused by gradual cooling from the melt state and decoloring caused by heating from the colored state, the aggregated structure of the leuco dye and the reversible color developer changes at the temperature T2, resulting in phase separation or crystallization of the reversible color developer.

Further, when the recording layer is repeatedly heated to the temperature T3 equal to or higher than the melting temperature T1, erasion failure may occur to thereby make it impossible to erase an image even after heating to the erasing temperature. This is believed to be because the reversible color developer is thermally decomposed to be less easily aggregable or crystallizable to thereby be less easily separable from the leuco dye. A difference between the melting temperature T1 and the temperature T3 illustrated in FIG. 3A may be decreased upon heating the thermoreversible recording medium to prevent deterioration of the thermoreversible recording medium due to repeated rewriting.

Figure 4:
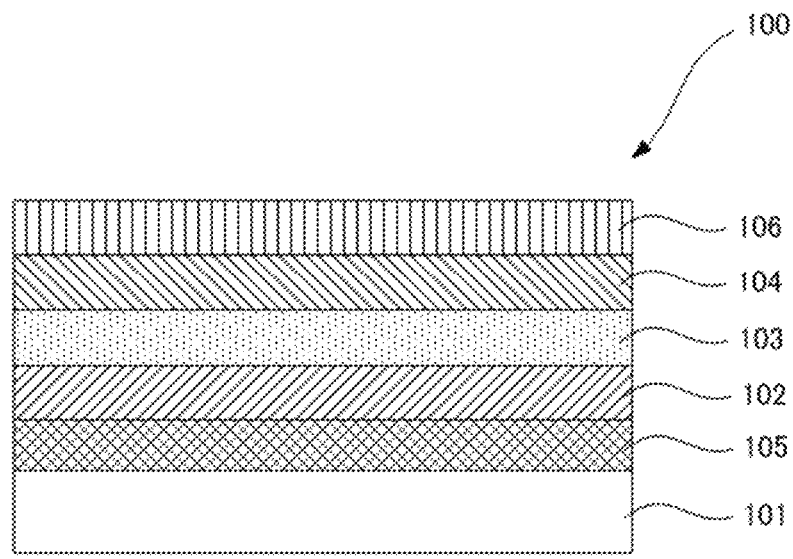
FIG. 4 is a schematic cross-sectional view illustrating one exemplary layer configuration of a thermoreversible recording medium.

FIG. 4 is a schematic cross-sectional view illustrating one exemplary layer configuration of a thermoreversible recording medium.

The layer configuration of the thermoreversible recording medium 100 illustrated in FIG. 4 includes a hollow layer 105 and a thermoreversible recording layer 102 on (a support member+a first oxygen barrier layer) 101, and further includes an intermediate layer 103, a second oxygen barrier layer 104, and an UV ray absorbing layer 106 in this order on the thermoreversible recording layer.

EXAMPLES

Examples of the present invention now will be described, but the present invention is not limited thereto in any way.
<Conveyer Line System>

In a conveyor line system including an image processing apparatus according to the present example, one sheet of the thermoreversible recording medium is attached on one conveying container. The conveyor line system should process a predetermined number or more of a conveying container (thermoreversible recording medium) per day. Generally, throughput of 1,200 containers or more per hour is required. In other words, one conveying container should be processed for 3.0 seconds or shorter on average. However, out of the 3.0 seconds, it takes 0.6 seconds to convey the conveying container to convey the conveying container to a position at which laser beams are emitted for erasing and recording an image. Therefore, a period of time actually available for rewriting one conveying container is 2.4 seconds or shorter on average except for the conveying time. Out of the 2.4 seconds, it takes 0.4 seconds from the completion of the image erasing step to the beginning of the image recording step and it takes 0.6 seconds for the image recording step, so that the time available for the image erasing step (erasing time) should be 1.4 seconds or shorter on average throughout the day.

That is, the erasing time may be longer than 1.4 seconds in some periods of time due to sudden decreasing of the erasing environmental temperature and prolongation of the heating time, so long as the rewriting speed is 2.4 seconds or shorter per container on average throughout the day by shortening the heating time to 1.4 seconds or shorter in other periods of time.

For example, when the erasing environmental temperature was measured in winter (from December to February), the temperature was lower than 0° C. in a range of from 1% through 8% of the time from 7:00 AM through 10:00 AM. This means that the temperature was suddenly decreased to an unexpected level for a short time. In the case where the temperature is suddenly decreased to an unexpected level (e.g., lower than 0° C.) as described above, the erasing time may be set to 1.4 seconds or longer. However, the erasing time is set to 1.4 seconds or shorter at a temperature of 0° C. or higher to thereby keep the rewriting processing time of 2.4 seconds or shorter per container on average throughout the day.
<Thermoreversible Recording Medium>

Ricoh rewritable laser medium RLM 100L (50 mm×85 mm) (manufactured by Ricoh Company, Ltd.) was used.

Example 1

As illustrated in FIG. 1, an optical system was formed in which laser beams are emitted from a fiber-coupled laser diode beam source ELEMENT™ E12 (manufactured by nLIGHT Corporation, central wavelength: 976 nm, maximum emitting power: 105 W) serving as the laser beam source 11, collimated by a collimator lens 12b disposed in the downstream of an optical path of the emitted laser beams, and then condensed by the focal length control unit 16 and the condenser lens 18 disposed in the downstream of the collimator lens. Thereafter, a galvanoscanner 6230H (manufactured by Cambridge Inc.) disposed in the downstream side of the optical system scanned the laser beams to irradiate the thermoreversible recording medium with the laser beams, to thereby rewrite an image.

The thermoreversible recording medium was fixed so that the interwork distance from an optical head surface of the fiber-coupled laser diode beam source to the thermoreversible recording medium was 150 mm, and a spot diameter was adjusted with the focal length control unit 16 so that the spot diameter was minimized on the thermoreversible recording medium.

As for an environmental temperature sensor, THERMISTOR 103 ET-1 (manufactured by SEMITEC Corporation) was used.

As for a surface temperature sensor, FT-H30 (manufactured by KEYENCE CORPORATION) was used.

As for a distance sensor, a displacement sensor HL-G112-A-C5 (manufactured by Panasonic Industrial Devices SUNX Co., Ltd.) was used.
<Recording of Evaluated Image>

Figure 8:
FIG. 8 shows an evaluated image recorded on a thermoreversible recording medium.

For the purpose of evaluating the unerased density, a solid image (8 mm×8 mm) recorded at the upper right of the thermoreversible recording medium as illustrated in FIG. 8 was used as an evaluated image.

A reference condition for recording the evaluated image on the thermoreversible recording medium was as described below: recorded area: 50 mm×85 mm, scanning velocity Vw: 4,500 mm/s, spot diameter rw: 0.46 mm, and emitting power Pw settings: 90 W as peak power and 27% as pulse width (i.e., power emitted on the thermoreversible recording medium was 24.3 W). This condition was input from the information setting unit in the program section and stored in the memory (not illustrated). As distance information, the interwork distance between a laser beam emitting surface of the laser beam emitting unit and the thermoreversible recording medium of 150 mm was input. The distance sensor was also set to ON. Note that, the image recording time was 0.51 seconds.

Based on the reference condition, images was recorded with the erasing environmental temperature being varied (−5° C., 0° C., 25° C., and 40° C.), the environmental temperature sensor being set to ON and the surface temperature sensor being set to OFF in order to set the erasing environmental temperature as a target to be measured, and the temperature-based correction of the irradiating energy Ew being set to ON. The temperature-based correction of the irradiating energy Ew was performed by determining a correction amount of the pulse duty ratio from a temperature difference between a measured temperature value and the reference temperature of 25° C. using a correction factor of −0.5%/° C. and correcting the emitting power Pw of laser beams based on the correction amount. Specifically, in the case of the measured temperature value of 0° C., the temperature difference from the reference temperature of 25° C. was −25° C., so that the correction amount of the pulse duty ratio was determined as +12.5%. Then, laser beams are emitted at the pulse duty ratio of 30.4% which was determined by multiplying the setting value of the pulse duty ratio at 25° C. of 27.0% by 1.125.

<Image Erasing>

Evaluated images recorded at each temperature described above are made have a temperature equivalent to the recording environmental temperature, and then erased under the following conditions.

Two conditions for erasing the evaluated image which had been recorded on the thermoreversible recording medium were set in accordance with the measured temperature value.

Firstly, at the measured temperature value of 0° C. or higher but 40° C. or lower, the evaluated image was erased using the scanning operation illustrated in FIG. 7 under the following condition: erased area: 40 mm×75 mm, scanning velocity Ve: 2,200 mm/s, spot diameter re: 7.0 mm, pitch width: 1.0 mm, and emitting power Pe settings: 90 W as peak power and 78% as pulse duty ratio (i.e., power emitted on the thermoreversible recording medium was 70.2 W). This condition was input from an information setting unit in a program section and stored in a memory (not illustrated). Thus, the heating time te was 22.3 ms.

Secondly, at the measured temperature value of lower than 0° C., the scanning velocity Ve was decreased so as to increase the irradiating energy Ee to 1.1 times in order to prolong the heating time. That is, in this case, the condition for erasing the evaluated image was different from that in the case where the measured temperature value was 0° C. or higher but 40° C. or lower in that the scanning velocity Ve was 2,000 mm/s (0.9 times of that at the measured temperature value of 0° C. or higher but 40° C. or lower), the spot diameter re was 8.4 mm (1.2 times of that at the measured temperature value of 0° C. or higher but 40° C. or lower), the pulse duty ratio was 78% (i.e., power emitted on the thermoreversible recording medium was 70.2 W). Thus, the heating time te was 35.3 ms.

Note that, the image erasing was performed with a temperature-based correction of the irradiating energy using the environmental temperature sensor setting to ON. The temperature-based correction of the irradiating energy was performed by determining a correction amount of the pulse duty ratio from a temperature difference between a measured temperature value measured by the environmental temperature sensor and the reference temperature of 25° C. using a correction factor of −0.9%/° C. and correcting the emitting power Pe of laser beams based on the correction amount. Specifically, in the case of the measured temperature value of 0° C., the temperature difference from the reference temperature of 25° C. was −25° C., so that the correction amount of the pulse duty ratio was determined as +22.5%. Then, laser beams are emitted at the emitting power Pe of 95.55% which was determined by multiplying the setting value of the pulse duty ratio at 25° C. of 78.0% by 1.225. The irradiating energy Ee can be expressed as Ee=Pe/Ve/P where Pe denotes the emitting power, Ve denotes the scanning velocity, and P denotes the pitch width. The emitted energies Ee were determined as 44.6 mJ/mm$^2$, 39.1 mJ/mm$^2$, 31.9 mJ/mm$^2$, and 27.6 mJ/mm$^2$ at −5° C., 0° C., 25° C., and 40° C. The distance sensor was also set to ON.

Then, the unerased density was evaluated and an average erasing time per container was determined in Example 1 as described below. Results are presented in Table 1-2.

<Evaluation of Unerased Density>

Solid images (8 mm×8 mm) were recorded on the thermoreversible recording medium at the erasing environmental temperatures of −5° C., 0° C., 25° C., and 40° C. and then left to stand for 1 hour at the erasing environmental temperatures. Note that, the erasing environmental temperature was equivalent to the surface temperature of the thermoreversible recording medium. Then, the solid images were erased at the erasing environmental temperatures described above and the thermoreversible recording media on which the solid images had been erased left to stand at room temperature for 1 hour. The erased solid image density, which was density of a region on which the solid image had been recorded, and the background density, which was density of a region on which no image had been recorded (i.e., background portion), were measured by a portable spectrophotometer X-RITE 939 (manufactured by X-Rite Inc.), and then the background density was subtracted from the erased solid image density, which was determined as the unerased density. The unerased density was evaluated according to the following criteria.

Note that, the unerased density of less than 0.03 causes poor visibility, which is practically problematic.

[Evaluation Criteria]

A: The unerased density was 0.03 or more.

B: The unerased density was less than 0.03.

<Throughput Per Day>

The target throughput per day can be achieved when the rewriting processing time is 2.4 seconds or shorter per container on average. Therefore, the throughput per day of image rewriting processing was evaluated according to the following criteria.

However, even though the erasing environmental temperature is lower than 0° C. and the heating time is prolonged to thereby extend the processing time to longer than 2.4 seconds per container in some periods of time, the erasing environmental temperature is suddenly decreased to lower than 0° C. for only a short time. Therefore, the throughput per day is practically unproblematic, so long as the rewriting processing time is 2.4 seconds or shorter per container in the period of time for which the erasing environmental temperature is 0° C. or higher but 35° C. or lower.

<Comprehensive Evaluation>

Comprehensive evaluation was performed based on the evaluation result of the unerased density and the average erasing time per container according to the following criteria. The results are presented in Table 1-2.

[Evaluation Criteria]

A: The unerased density was evaluated as A and the average erasing time was 1.4 seconds or shorter.

B: The unerased density was evaluated as B or the average erasing time was longer than 1.4 seconds.

Example 2

The unerased density was evaluated and the average erasing time per container was determined in the same manner as in Example 1, except that the surface of the thermoreversible recording medium was set as the target to be measured and the environmental temperature sensor was set to OFF. Note that, the emitted energies Ee were determined as 44.6 mJ/mm$^2$, 39.1 mJ/mm$^2$, 31.9 mJ/mm$^2$, and 27.6 mJ/mm$^2$ at −5° C., 0° C., 25° C., and 40° C. Results are presented in Table 1-2.

Example 3

The unerased density was evaluated and the average erasing time per container was determined in the same manner as in Example 1, except that the erasing condition at the erasing environmental temperature of −5° C. was changed as described in Tables 1-1 and 1-2. Note that, the heating time and the irradiating energy were the same as in Example 1. Note that, the emitted energies Ee were determined as 44.6 mJ/mm$^2$, 39.1 mJ/mm$^2$, 31.9 mJ/mm$^2$, and 27.6 mJ/mm$^2$ at −5° C., 0° C., 25° C., and 40° C. Results are presented in Table 1-2.

Example 4

The unerased density was evaluated and the average erasing time per container was determined in the same manner as in Example 1, except that the erasing condition was changed as described in Tables 1-1 and 1-2. Note that, the emitted energies Ee were determined as 39.1 mJ/mm$^2$, 36.0 mJ/mm$^2$, 30.5 mJ/mm$^2$, and 26.4 mJ/mm$^2$ at 0° C., 5° C., 25° C., and 40° C. Results are presented in Table 1-2.

Example 5

The unerased density was evaluated and the average erasing time per container was determined in the same manner as in Example 1, except that the erasing condition was changed so as to be linear versus temperature as described in Tables 1-1 and 1-2. Note that, the emitted energies Ee were determined as 47.3 mJ/mm$^2$, 44.5 mJ/mm$^2$, 42.6 mJ/mm$^2$, 39.1 mJ/mm$^2$, 31.9 mJ/mm$^2$, and 27.6 mJ/mm$^2$ at −7° C., −5° C., −3° C., 0° C., 25° C., and 40° C. Results are presented in Table 1-2.

Comparative Example 1

The unerased density was evaluated and the average erasing time per container was determined in the same manner as in Example 1, except that the erasing condition at the erasing environmental temperature of −5° C. was changed as described in Tables 2-1 and 2-2. Note that, the emitted energies Ee were determined as 40.5 mJ/mm$^2$, 39.1 mJ/mm$^2$, 31.9 mJ/mm$^2$, and 27.6 mJ/mm$^2$ at −5° C., 0° C., 25° C., and 40° C. Results are presented in Table 2-2.

Comparative Example 2

The unerased density was evaluated and the average erasing time per container was determined in the same manner as in Example 1, except that the erasing condition at the erasing environmental temperature of −5° C. was changed as described in Tables 2-1 and 2-2. Note that, the heating time and the irradiating energy were the same as in Example 1. Note that, the emitted energies Ee were determined as 44.6 mJ/mm$^2$, 43.0 mJ/mm$^2$, 35.1 mJ/mm$^2$, and 30.4 mJ/mm$^2$ at −5° C., 0° C., 25° C., and 40° C. Results are presented in Table 2-2.

Comparative Example 3

The unerased density was evaluated and the average erasing time per container was determined in the same manner as in Example 1, except that the temperature-based correction of the irradiating energy in the image erasing step was set to OFF. Note that, the emitted energies Ee were determined as 35.1 mJ/mm$^2$, 31.9 mJ/mm$^2$, 31.9 mJ/mm$^2$, and 31.9 mJ/mm$^2$ at −5° C., 0° C., 25° C., and 40° C. Results are presented in Table 2-2.

Comparative Example 4

The unerased density was evaluated and the average erasing time per container was determined in the same manner as in Example 4, except that that the erasing condition at the erasing environmental temperature of 0° C. was changed as described below: the spot diameter: 6.0 mm, the scanning velocity: 2,300 mm/s, and the heating time: 15.7 ms. Note that, the emitted energies Ee were determined as 37.4 mJ/mm$^2$, 36.0 mJ/mm$^2$, 30.5 mJ/mm$^2$, and 26.4 mJ/mm$^2$ at 0° C., 5° C., 25° C., and 40° C. Results are presented in Table 2-2.

TABLE 1-1

| | Measured temperature value | Target to be measured | Temperature-based correction of irradiating energy | Erasing condition Spot diameter (mm) | Scanning velocity (mm/s) |
|---|---|---|---|---|---|
| Ex. 1 | −5° C. 0° C. 25° C. 40° C | Erasing environment | ON | 8.4 7.0 | 2,000 2,200 |
| Ex. 2 | −5° C. 0° C. 25° C. 40° C | Surface of thermoreversible recording medium | ON | 8.4 7.0 | 2,000 2,200 |
| Ex. 3 | −5° C. 0° C. 25° C. 40° C | Erasing environment | ON | 7.0 | 1,390 2,200 |
| Ex. 4 | 0° C. 5° C. 25° C. 40° C | Erasing environment | ON | 7.0 6.0 | 2,200 2,300 |
| Ex. 5 | −7° C. −5° C. −3° C. 0° C. 25° C. 40° C | Erasing environment | ON | 8.8 8.4 7.9 7.0 | 1,910 2,000 2,070 2,200 |

TABLE 1-2

| | Erasing condition Emitted energy (mJ/mm$^2$) | Heating time (ms) | Erasing time (s) | Erasing quality Unerased density | | Comprehensive evaluation |
|---|---|---|---|---|---|---|
| Ex. 1 | 44.6 39.1 31.9 27.6 | 35.3 22.3 | 1.50 1.36 | 0.025 0.019 0.004 0.003 | A A A A | A |
| Ex. 2 | 44.6 39.1 31.9 27.6 | 35.3 22.3 | 1.50 1.36 | 0.023 0.018 0.004 0.002 | A A A A | A |
| Ex. 3 | 44.6 39.1 31.9 27.6 | 35.3 22.3 | 2.16 1.36 | 0.024 0.019 0.004 0.003 | A A A A | A |
| Ex. 4 | 39.1 36.0 30.5 26.4 | 22.3 15.7 | 1.36 1.30 | 0.019 0.018 0.006 0.005 | A A A A | A |
| Ex. 5 | 47.3 44.6 42.6 39.1 31.9 27.6 | 40.5 35.3 30.1 22.3 | 1.57 1.50 1.45 1.36 | 0.028 0.025 0.021 0.019 0.004 0.003 | A A A A A A | A |

TABLE 2-1

| | Measured temperature value | Target to be measured | Temperature-based correction of irradiating energy | Erasing condition Spot diameter (mm) | Scanning velocity (mm/s) |
|---|---|---|---|---|---|
| Comp. Ex. 1 | −5° C. 0° C. 25° C. 40° C. | Erasing environment | ON | 7.0 | 2,200 |
| Comp. Ex. 2 | −5° C. 0° C. 25° C. 40° C. | Erasing environment | ON | 8.4 | 2,000 |
| Comp. Ex. 3 | −5° C. 0° C. 25° C. 40° C. | — | OFF | 8.4 7.0 | 2,000 2,200 |
| Comp. Ex. 4 | 0° C. 5° C. 25° C. 40° C. | Erasing environment | ON | 6.0 | 2,300 |

TABLE 2-2

| | Erasing condition | | | | |
|---|---|---|---|---|---|
| | Emitted energy (mJ/mm$^2$) | Heating time (ms) | Erasing time (s) | Erasing quality Unerased density | Comprehensive evaluation |
| Comp. Ex. 1 | 40.5 | 22.3 | 1.36 | 0.105 B | B |
| | 39.1 | | | 0.019 A | |
| | 31.9 | | | 0.004 A | |
| | 27.6 | | | 0.003 A | |
| Comp. Ex. 2 | 44.6 | 35.3 | 1.50 | 0.024 A | B |
| | 43.0 | | | 0.010 A | |
| | 35.1 | | | 0.001 A | |
| | 30.4 | | | 0.001 A | |
| Comp. Ex. 3 | 35.1 | 35.3 | 1.50 | 0.084 B | B |
| | 31.9 | 22.3 | 1.36 | 0.058 B | |
| | | | | 0.003 A | |
| | | | | 0.003 A | |
| Comp. Ex. 4 | 37.4 | 15.7 | 1.30 | 0.038 B | B |
| | 36.0 | | | 0.018 A | |
| | 30.5 | | | 0.006 A | |
| | 26.4 | | | 0.005 A | |

From the results in Tables 1-1 and 1-2, it can be seen from Examples 1 and 2, the erasing density was able to be decreased by varying the spot diameter, the scanning velocity, and the pulse duty ratio depending on the measured temperature value to control the heating time. Note that, although the erasing time was 1.50 seconds per container at the erasing environmental temperature of −5° C., the erasing environmental temperature was suddenly increased to lower than 0° C. for only a short time. Therefore, the throughput per day is practically unproblematic. Specifically, the measured temperature value was lower than 0° C. for 4% of the daily operating time, which was concentrated from 8:00 AM through 10:00 AM, when the system was operated from 8:00 AM to 8:00 PM (20:00) in winter (from December to February). Based on this, the average erasing time for a daily operating time was determined as 1.366 seconds per container. Therefore, the erasing time was confirmed as practically unproblematic even when the heating time was set to be long so as to ensure the image quality under a low temperature environment of lower than 0° C.

It can be seen from Example 3 that, like in Examples 1 and 2, the unerased density was able to be prevented from increasing by varying the scanning velocity to control the heating time. However, the erasing time was prolonged at −5° C. Therefore, it is believed to be more effective to control the heating time by varying the spot diameter in combination with the scanning velocity like in Examples 1 and 2. The average erasing time for a daily operating time was determined as 1.392 seconds per container, which is practically unproblematic. However, Examples 1 and 2 are more preferable due to shorter erasing time.

In Example 4, it was assumed that the erasing environmental temperature is typically 5° C. or higher, but the erasing environmental temperature may be suddenly decreased to lower than −5° C. depending on an operation and a location. It can be seen that, in this example, the thermoreversible recording media was able to be processed at a higher speed than in Example 1 and the image quality at 0° C., which was not able to be ensured in Comparative Example 4, was able to be ensured.

In Example 5, the heating time and the erasing condition were linearly varied depending on the erasing environmental temperature. This made it possible to keep the image quality and minimize prolongation of the processing time, resulting in shorter erasing time. The average erasing time for a daily operating time was determined as 1.364 seconds per container, which is practically unproblematic and more preferable than that of Examples 1 and 2.

From the results in Tables 2-1 and 2-2, it can be seen from Comparative Example 1 that, when the heating time was set to be constant in order to achieve satisfactory rewriting processing time per container, the unerased density was not able to be prevented from increasing at the erasing environmental temperature of lower than 0° C., potentially leading to failure such as reading error of the barcode and poor visibility. This may cause misdelivery, potentially making it difficult to stably operate in physical distribution management system.

It can be seen from Comparative Example 2 that, when the heating time was set to be constant in order to prevent the unerased density from increasing, the rewriting processing time per container was not able to be satisfied at all erasing environmental temperatures. As a result, satisfactory throughput per day was not able to be achieved, making it difficult to be introduced into the physical distribution management system.

In Comparative Examples 3, the temperature-based correction of the irradiating energy was set to OFF. Comparing with Examples 1 and 2, it can be seen that the unerased density was not able to be prevented from increasing at a low recording environmental temperatures.

The invention described in Japanese Unexamined Patent Application Publication No. 2008-194905 suggests an image processing method including a temperature-based correction of irradiating energy, which corresponds to Comparative Examples 1 and 2. In this case, it is believed that the unerased density and the throughput for image rewriting are unsatisfactory when the erasing environmental temperature is suddenly increased to lower than 0° C.

The invention described in Japanese Unexamined Patent Application Publication No. 2004-160928 describes a recording erasing apparatus for a reversible thermosensitive recording medium, the apparatus being configured to control a setting temperature of a heating member for image erasing, and a conveying speed and a conveying timing of the reversible thermosensitive recording medium to uniformly erase an image with the heating member being pressed against the reversible thermosensitive recording medium. In this case, when the heating time is prolonged in order to improve erasing quality, the conveying speed is decreased. As a result, the throughput is greatly decreased and printing quality is deteriorated since a conveying time becomes longer than the heating time upon printing and thus the thermosensitive recording medium cannot be cooled rapidly.

On the other hand, in the image erasing method according to the present invention, the heating time upon image erasing is controlled only by varying the conveying speed. Therefore, the present invention is not highly related to the invention described in Japanese Unexamined Patent Application Publication No. 2004-160928.

Note that, in Example 1, the image processing apparatus was incorporated into the conveyer system. The barcodes were rewritten at the recording environmental temperatures and the erasing environmental temperatures of −5° C., 0° C., 25° C., and 40° C. and then read, which was repeated 3,000 times. As a result, it was confirmed that the barcodes were able to be read at all conditions described above.

Aspects of the present invention are as follows:
<1> An image erasing method including:
heating a thermoreversible recording medium with laser beams to erase an image which has been recorded on the thermoreversible recording medium, the thermoreversible recording medium reversibly changing between a colored state and a decolored state depending on a heating temperature and a cooling time; and measuring at least one of a surface temperature of the thermoreversible recording medium and an erasing environmental temperature before a beginning of erasing the image to obtain a measured temperature value and controlling a heating time with the laser beams to be emitted for erasing the image depending on the measured temperature value.

<2> The image erasing method according to <1>,
wherein the controlling further includes controlling a spot diameter of the laser beams to be emitted for erasing the image which has been recorded on the thermoreversible recording medium depending on the measured temperature value.

<3> The image erasing method according to <1> or <2>,
wherein the controlling further includes controlling emitting power of the laser beams to be emitted for erasing the image which has been recorded on the thermoreversible recording medium depending on the measured temperature value.

<4> The image erasing method according to any one of <1> to <3>,
wherein the image includes an optical information code.

<5> The image erasing method according to <4>,
wherein the optical information code includes a barcode.

<6> An image erasing apparatus including:
a laser beam emitting unit configured to irradiate a thermoreversible recording medium with the laser beams to heat the thermoreversible recording medium, to erase an image which has been recorded on the thermoreversible recording medium, the thermoreversible recording medium reversibly changing between a colored state and a decolored state depending on a heating temperature and a cooling time;
a laser beam scanning unit configured to scan the laser beams to erase the image which has been recorded on the thermoreversible recording is medium; and
a control unit configured to measure at least one of a surface temperature of the thermoreversible recording medium and an erasing environmental temperature before a beginning of erasing the image to obtain a measured temperature value and control a heating time with the laser beams to be emitted for erasing the image depending on the measured temperature value.

<7> The image erasing apparatus according to <6>,
wherein the laser beam emitting unit includes a laser beam source, the laser beam source being a fiber-coupled laser diode which is configured to emit laser beams having a wavelength in a range of 700 nm or longer but 1,600 nm or shorter.

<8> The image erasing apparatus according to <6> or <7>,
wherein the laser beams are emitted for erasing the image at emitting power in a range of from 5 W or more but 200 W or less.

<9> The image erasing apparatus according to any one of <6> to <8>, wherein the laser beams are emitted for erasing the image at scanning velocity in a range of from 100 mm/s or more but 20,000 mm/s or less.

<10> The image erasing apparatus according to any one of <6> to <9>, wherein the laser beams are emitted for erasing the image at a spot diameter in a range of from 1 mm or more but 20 mm or less.

<11> The image erasing apparatus according to any one of <6> to <10>, wherein the laser beams are emitted for recording the image at the emitting power in a range of from 1 W or more but 200 W or less.

<12> The image erasing apparatus according to any one of <6> to <11>, wherein the laser beams are emitted for recording the image at the scanning velocity in a range of from 300 mm/s or more but 15,000 mm/s or less.

<13> The image erasing apparatus according to any one of <6> to <12>, wherein the laser beams are emitted for recording the image at the spot diameter in a range of from 0.02 mm or more but 2.0 mm or less.

<14> The image erasing apparatus according to any one of <6> to <13>, wherein the laser beams are scanned at a pitch width in a range of 0.3 mm or more but 6 mm or less.

<15> A conveyor line system including
the image erasing apparatus according to any one of <6> to <14>.

The image erasing method according to any one of <1> to <5>, the image erasing apparatus according to any one of <6> to <14>, and the conveyor line system according to <15> can solve the existing problems and achieve the object of the present invention.

What is claimed is:

1. An image erasing method comprising:
heating a thermoreversible recording medium with laser beams to erase an image which has been recorded on the thermoreversible recording medium, the thermoreversible recording medium reversibly changing between a colored state and a decolored state depending on a heating temperature and a cooling time; and
measuring at least one of a surface temperature of the thermoreversible recording medium and an erasing environmental temperature before a beginning of erasing the image to obtain a measured temperature value and controlling a heating time with the laser beams to be emitted for erasing the image depending on the measured temperature value.

2. The image erasing method according to claim 1,
wherein the controlling further comprises controlling a spot diameter of the laser beams to be emitted for erasing the image which has been recorded on the thermoreversible recording medium depending on the measured temperature value.

3. The image erasing method according to claim 1,
wherein the controlling further comprises controlling emitting power of the laser beams to be emitted for erasing the image which has been recorded on the thermoreversible recording medium depending on the measured temperature value.

4. The image erasing method according to claim 1,
wherein the image comprises an optical information code.

5. The image erasing method according to claim 4,
wherein the optical information code comprises a barcode.

6. An image erasing apparatus comprising:
a laser beam emitting unit configured to irradiate a thermoreversible recording medium with the laser beams to heat the thermoreversible recording medium, to erase an image which has been recorded on the thermoreversible recording medium, the thermoreversible recording medium reversibly changing between a colored state and a decolored state depending on a heating temperature and a cooling time;
a laser beam scanning unit configured to scan the laser beams to erase the image which has been recorded on the thermoreversible recording medium; and
a control unit configured to measure at least one of a surface temperature of the thermoreversible recording medium and an erasing environmental temperature before a beginning of erasing the image to obtain a measured temperature value and control a heating time with the laser beams to be emitted for erasing the image depending on the measured temperature value.

7. The image erasing apparatus according to claim 6, wherein the laser beam emitting unit comprises a laser beam source, the laser beam source being a fiber-coupled laser diode which is configured to emit laser beams having a wavelength in a range of 700 nm or longer but 1,600 nm or shorter.

8. The image erasing apparatus according to claim 6, wherein the laser beams are emitted for erasing the image at emitting power in a range of from 5 W or more but 200 W or less.

9. The image erasing apparatus according to claim 6, wherein the laser beams are emitted for erasing the image at scanning velocity in a range of from 100 mm/s or more but 20,000 mm/s or less.

10. The image erasing apparatus according to claim 6, wherein the laser beams are emitted for erasing the image at a spot diameter in a range of from 1 mm or more but 20 mm or less.

11. The image erasing apparatus according to claim 6, wherein the laser beams are emitted for recording the image at emitting power in a range of from 1 W or more but 200 W or less.

12. The image erasing apparatus according to claim 6, wherein the laser beams are emitted for recording the image at scanning velocity in a range of from 300 mm/s or more but 15,000 mm/s or less.

13. The image erasing apparatus according to claim 6, wherein the laser beams are emitted for recording the image at a spot diameter in a range of from 0.02 mm or more but 2.0 mm or less.

14. The image erasing apparatus according to claim 6, wherein the laser beams are scanned at a pitch width in a range of 0.3 mm or more but 6 mm or less.

15. A conveyor line system comprising
an image erasing apparatus, the image erasing apparatus comprising:
  a laser beam emitting unit configured to irradiate a thermoreversible recording medium with the laser beams to heat the thermoreversible recording medium, to erase an image which has been recorded on the thermoreversible recording medium, the thermoreversible recording medium reversibly changing between a colored state and a decolored state depending on a heating temperature and a cooling time;
  a laser beam scanning unit configured to scan the laser beams to erase the image which has been recorded on the thermoreversible recording medium; and
  a control unit configured to measure at least one of a surface temperature of the thermoreversible recording medium and an erasing environmental temperature before a beginning of erasing the image to obtain a measured temperature value and control a heating time with the laser beams to be emitted for erasing the image depending on the measured temperature value.

* * * * *